M. PARSONS.
COFFEE POT.
APPLICATION FILED JAN. 16, 1911.
1,015,396.
Patented Jan. 23, 1912.
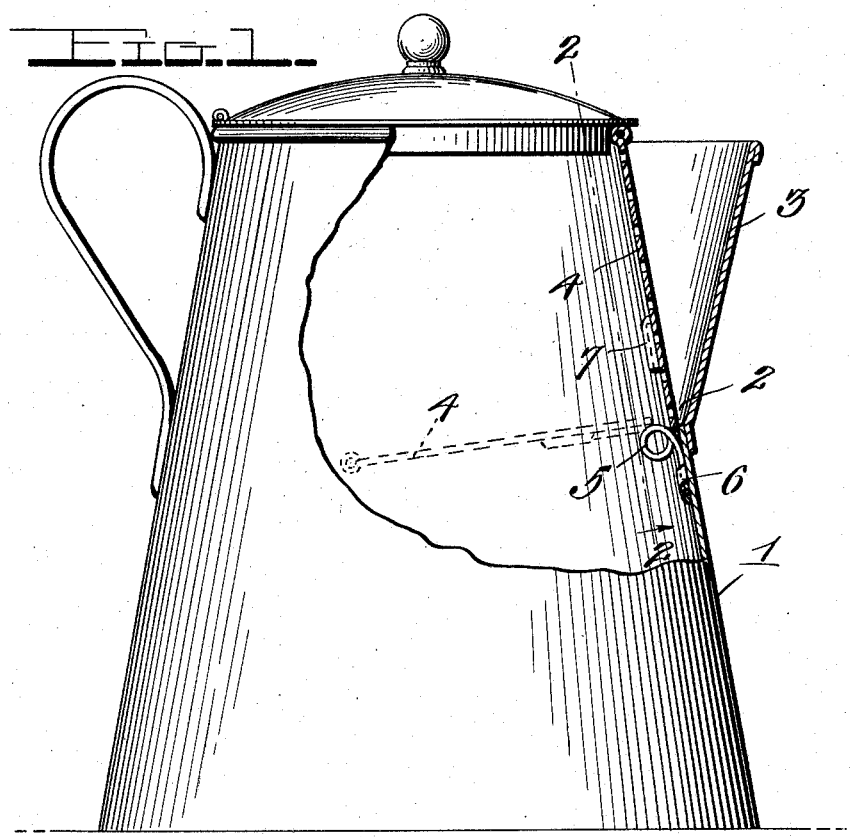
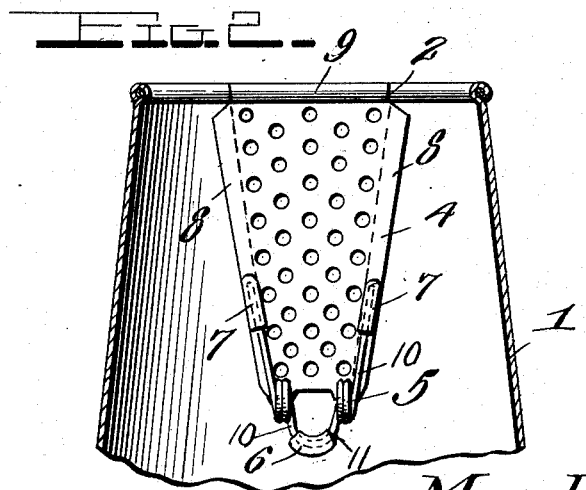
Witnesses
Chas. L. Griesbauer.
H. E. Coleman.
Inventor
Mary Parsons,
By Watson E. Coleman.
Attorney

UNITED STATES PATENT OFFICE.

MARY PARSONS, OF MANHATTAN, KANSAS.

COFFEE-POT.

1,015,396.   Specification of Letters Patent.   Patented Jan. 23, 1912.

Application filed January 16, 1911. Serial No. 602,898.

*To all whom it may concern:*

Be it known that I, MARY PARSONS, a citizen of the United States, residing at Manhattan, in the county of Riley and State of Kansas, have invented certain new and useful Improvements in Coffee-Pots, of which the following is a specification, reference being had to the accompanying drawings.

This invention relates to coffee and tea pots and more particularly to that class which are provided with a movable strainer, and has for its object to provide a coffee or tea pot having a strainer yieldingly mounted therein that can be moved away from the spout to allow the same to be cleaned, and when the spout is cleaned the strainer will automatically resume its normal position.

Another object is to provide a coffee or tea pot which will possess advantages in points of efficiency, durability and is inexpensive of manufacture, and at the same time being simple in construction and operation.

With the foregoing and other objects in view, the invention consists in the novel features of construction hereinafter described, pointed out in the claims and shown in the accompanying drawings, in which—

Figure 1 is a sectional view of a coffee pot showing the strainer secured to the inside thereof; and Fig. 2 is a sectional view taken on the line 2—2 of Fig. 1.

Referring more particularly to the drawings 1 represents the body of the coffee or tea pot having an opening 2 formed therein and the spout 3 arranged adjacent the opening 2. A strainer 4 is yieldingly mounted on the inner side of the body and adapted to be held in a normally closed position by means of a spring 10. This spring is a U-shaped wire, the bight portion 11 of which is secured, as by means of solder, as at 6, to the inner side of the pot below the opening 2. The arms of the spring are provided, immediately above the bight portion, with spring coils 5 and the ends of the arms bear against the inner side of and are secured to the sides of the strainer as at 7. The strainer is somewhat wider than the opening 2 so that its sides 8 overlap the sides of the opening 2 and bear against the body of the pot. The upper end of the strainer is provided with a bead 9 which corresponds with that at the upper edge of the wall of the body of the pot. The spring, by means of its coils, keeps the strainer normally bearing against the wall of the pot and across the opening 2 so as to close the inner end of the spout, excepting for the perforations in the strainer, and, moreover, the coils of the spring also act as pivotal connections between the pot and the strainer to enable the strainer to be swung inwardly as indicated in dotted lines in Fig. 1 to uncover the inner end of the spout.

When it is desired to clean the spout 3 the strainer 4 is moved away from the opening 2 toward the inside of the pot, and after the cleaning operation is over the strainer when released will automatically resume its normal position. The strainer 4 is made in such shape as to contour to the body of the pot so that it will fit snugly up against the same and not allow any coffee or tea grounds to get out through the spout.

Having thus described the invention what is claimed is:

A coffee or tea pot having a spout and an opening in the wall of the pot at the inner side of the spout, a strainer shaped to cover the said opening and wider than the same so that its sides are adapted to bear against the wall of the pot on opposite sides of said opening, and a U-shaped spring comprising a spring wire having its bight secured to the wall of the pot below the said opening, its arms bearing against the sides of and secured at their upper ends to the said strainer and spring coils formed in the arms of the wire at points near the bight, said spring coils acting to keep the strainer normally closed against the wall of the pot and over the opening and also acting as pivots to enable the strainer to be turned inwardly and downwardly in the pot, to uncover the opening and afford access to the spout.

In testimony whereof I hereunto affix my signature in the presence of two witnesses.

MARY PARSONS.

Witnesses:
 B. W. SMITH,
 J. T. SMITH.

---

Copies of this patent may be obtained for five cents each, by addressing the "Commissioner of Patents, Washington, D. C."